United States Patent
Fujii et al.

(10) Patent No.: US 11,441,717 B2
(45) Date of Patent: Sep. 13, 2022

(54) RESIN PIPE FITTING

(71) Applicant: NIPPON PILLAR PACKING CO., LTD., Osaka (JP)

(72) Inventors: Makoto Fujii, Osaka (JP); Masaki Miyamoto, Osaka (JP); Tatsuya Fujii, Osaka (JP); Toshihide Iida, Osaka (JP); Tomoyuki Koike, Osaka (JP); Shintaro Makihata, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 524 days.

(21) Appl. No.: 16/330,966

(22) PCT Filed: Jun. 15, 2017

(86) PCT No.: PCT/JP2017/022142
§ 371 (c)(1),
(2) Date: Mar. 6, 2019

(87) PCT Pub. No.: WO2018/066178
PCT Pub. Date: Apr. 12, 2018

(65) Prior Publication Data
US 2019/0257458 A1    Aug. 22, 2019

(30) Foreign Application Priority Data

Oct. 3, 2016 (JP) .............................. JP2016-195426
Oct. 3, 2016 (JP) .............................. JP2016-195427

(51) Int. Cl.
*F16L 47/04* (2006.01)
*F16L 19/028* (2006.01)
(Continued)

(52) U.S. Cl.
CPC ........... *F16L 47/041* (2019.08); *F16L 19/028* (2013.01); *F16L 19/043* (2013.01); *F16L 19/061* (2013.01)

(58) Field of Classification Search
CPC ..... F16L 47/041; F16L 19/028; F16L 19/043; F16L 19/061
See application file for complete search history.

(56) References Cited

U.S. PATENT DOCUMENTS 4,848,804 A * 7/1989 Weigl .................... F16L 19/061
                                                  285/354
5,388,871 A * 2/1995 Saitoh ................... F16L 47/041
                                                  285/423
(Continued)

FOREIGN PATENT DOCUMENTS

DE      3310034 A1     9/1984
EP   1 041 330 A1    10/2000
(Continued)

OTHER PUBLICATIONS

International Search Report dated Sep. 5, 2017 in PCT/JP2017/022142 filed on Jun. 15, 2017.
(Continued)

*Primary Examiner* — Matthew Troutman
*Assistant Examiner* — Fannie C Kee
(74) *Attorney, Agent, or Firm* — Oblon, McClelland, Maier & Neustadt, L.L.P.

(57) ABSTRACT

A resin tube fitting has a body with a sleeve allowing the longitudinal end of the tube to be put therein, an inner ring with a press-in portion configured to be pressed in the longitudinal end of the tube, and a union nut with a connector configured to be screwed to an outer periphery of the body to allow the longitudinal end of the tube to be put radially between the connector and the press-in portion. The inner ring and the union nut are made of resin, which has a
(Continued)

property of contracting in response to change in ambient temperature. The radial contraction rate of the connector is higher by 0.05% or more than that of the press-in portion of the inner ring.

4 Claims, 10 Drawing Sheets

(51) Int. Cl.
F16L 19/04 (2006.01)
F16L 19/06 (2006.01)

(56) References Cited

U.S. PATENT DOCUMENTS

| | | | | | |
|---|---|---|---|---|---|
| 5,498,036 | A | * | 3/1996 | Kingsford | F16L 19/028 285/123.1 |
| 5,743,572 | A | * | 4/1998 | Nishio | F16L 47/041 285/423 |
| 6,045,164 | A | * | 4/2000 | Nishio | F16L 19/041 285/331 |
| 6,089,621 | A | * | 7/2000 | Nishio | F16L 47/041 285/423 |
| 6,513,839 | B2 | * | 2/2003 | Nishio | F16L 19/02 285/331 |
| 6,517,123 | B2 | * | 2/2003 | Nishio | F16L 47/041 285/331 |
| 6,991,266 | B2 | * | 1/2006 | Nishio | F16L 47/041 285/331 |
| 2002/0167169 | A1 | | 11/2002 | Nishio | |
| 2006/0244256 | A1 | * | 11/2006 | Hyobu | F16L 19/025 285/247 |
| 2016/0061360 | A1 | | 3/2016 | Fujii et al. | |
| 2016/0061361 | A1 | * | 3/2016 | Fujii | F16L 19/028 285/382.5 |
| 2016/0076686 | A1 | | 3/2016 | Fujii et al. | |
| 2017/0159854 | A1 | | 6/2017 | Fujii et al. | |

FOREIGN PATENT DOCUMENTS

| | | |
|---|---|---|
| EP | 3 001 086 A1 | 3/2014 |
| EP | 2 995 838 A1 | 3/2016 |
| JP | 49-9784 | 3/1974 |
| JP | 60-175983 U | 11/1985 |
| JP | 61-179481 U | 11/1986 |
| JP | 10-54489 A | 2/1998 |
| WO | WO 2016/052223 A1 | 4/2016 |

OTHER PUBLICATIONS

Korean Office Action dated May 26, 2020 in Korean Patent Application No. 10-2019-7006614 (with English translation), 6 pages.
Extended European Search Report dated Jun. 24, 2020 in European Patent Application No. 17858018.9, 8 pages.

* cited by examiner

FIG.2

|  |  | EMBODIMENT 1 | | | EMBODIMENT 2 | | |
|---|---|---|---|---|---|---|---|
|  |  | BEFORE HEATING (mm) | AFTER HEATING (mm) | CONTRACTION RATE (%) | BEFORE HEATING (mm) | AFTER HEATING (mm) | CONTRACTION RATE (%) |
| INNER RING | OUTER DIAMETER A OF PRESS-IN PORTION | 22.01 | 22.01 | 0.00 | 22.00 | 22.00 | 0.00 |
|  | INNER DIAMETER B OF CONNECTOR | 28.16 | 28.02 | 0.50 | 27.82 | 27.80 | 0.07 |
| UNION NUT | INNER DIAMETER C OF PRESSING PORTION | 19.02 | 19.00 | 0.11 | 18.99 | 18.98 | 0.05 |

FIG.3

|  | TARGET 1 | | | TARGET 2 | | | TARGET 3 | | | TARGET 4 | | |
|---|---|---|---|---|---|---|---|---|---|---|---|---|
|  | BEFORE HEATING (mm) | AFTER HEATING (mm) | CONTRACTION RATE (%) | BEFORE HEAT. (mm) | AFTER HEAT. (mm) | CONT. RATE (%) | BEFORE HEAT. (mm) | AFTER HEAT. (mm) | CONT. RATE (%) | BEFORE HEAT. (mm) | AFTER HEAT. (mm) | CONT. RATE (%) |
| INNER RING A | 22.01 | 22.01 | 0.00 | 22.14 | 22.02 | 0.54 | 22.00 | 22.00 | 0.00 | 22.00 | 21.99 | 0.05 |
| INNER RING B | 27.95 | 27.95 | 0.00 | 28.16 | 28.02 | 0.50 | 27.82 | 27.82 | 0.00 | 27.82 | 27.80 | 0.07 |
| UNION NUT C | 18.90 | 18.90 | 0.00 | 19.02 | 19.00 | 0.11 | 18.99 | 18.99 | 0.00 | 18.99 | 18.98 | 0.05 |

FIG.4

| DIFFERENCE IN CONTRACTION RATE | EMBODIMENT 1 | EMBODIMENT 2 | TARGET 1 | TARGET 2 | TARGET 3 | TARGET 4 |
|---|---|---|---|---|---|---|
| B−A | 0.50 | 0.07 | 0.00 | −0.04 | 0.00 | 0.02 |
| C−A | 0.11 | 0.05 | 0.00 | −0.43 | 0.00 | 0.00 |

FIG.7

| | | EMBODIMENT 3 | | | EMBODIMENT 4 | | |
|---|---|---|---|---|---|---|---|
| | | BEFORE HEATING (mm) | AFTER HEATING (mm) | CONTRA-CTION RATE (%) | BEFORE HEATING (mm) | AFTER HEATING (mm) | CONTRA-CTION RATE (%) |
| INNER RING | OUTER DIAMETER D OF PRESS-IN PORTION | 22.00 | 21.99 | 0.05 | 22.00 | 21.99 | 0.05 |
| | INNER DIAMETER E OF CONNECTOR | 28.16 | 28.02 | 0.50 | 28.20 | 28.09 | 0.39 |
| UNION NUT | INNER DIAMETER F OF PRESSING PORTION | 19.02 | 19.00 | 0.11 | 19.03 | 19.01 | 0.11 |

FIG.8

<table>
<tr><th colspan="2"></th><th colspan="3">TARGET 5</th><th colspan="3">TARGET 6</th><th colspan="3">TARGET 7</th></tr>
<tr><th colspan="2"></th><th>BEFORE HEATING (mm)</th><th>AFTER HEATING (mm)</th><th>CONTRA-CTION RATE (%)</th><th>BEFORE HEATING (mm)</th><th>AFTER HEATING (mm)</th><th>CONTRA-CTION RATE (%)</th><th>BEFORE HEATING (mm)</th><th>AFTER HEATING (mm)</th><th>CONTRA-CTION RATE (%)</th></tr>
<tr><td rowspan="2">INNER RING</td><td>D</td><td>22.14</td><td>22.02</td><td>0.54</td><td>22.08</td><td>21.99</td><td>0.41</td><td>22.00</td><td>21.99</td><td>0.05</td></tr>
<tr><td>E</td><td>28.16</td><td>28.02</td><td>0.50</td><td>28.20</td><td>28.09</td><td>0.39</td><td>27.82</td><td>27.80</td><td>0.07</td></tr>
<tr><td>UNION NUT</td><td>F</td><td>19.02</td><td>19.00</td><td>0.11</td><td>19.03</td><td>19.01</td><td>0.11</td><td>18.99</td><td>18.98</td><td>0.05</td></tr>
</table>

FIG.9

| DIFFERENCE IN CONTRACTION RATE | EMBODIMENT 3 | EMBODIMENT 4 | TARGET 5 | TARGET 6 | TARGET 7 |
|---|---|---|---|---|---|
| E − D | 0.45 | 0.34 | - 0.04 | - 0.02 | 0.02 |
| F − D | 0.06 | 0.06 | - 0.44 | - 0.30 | 0.00 |

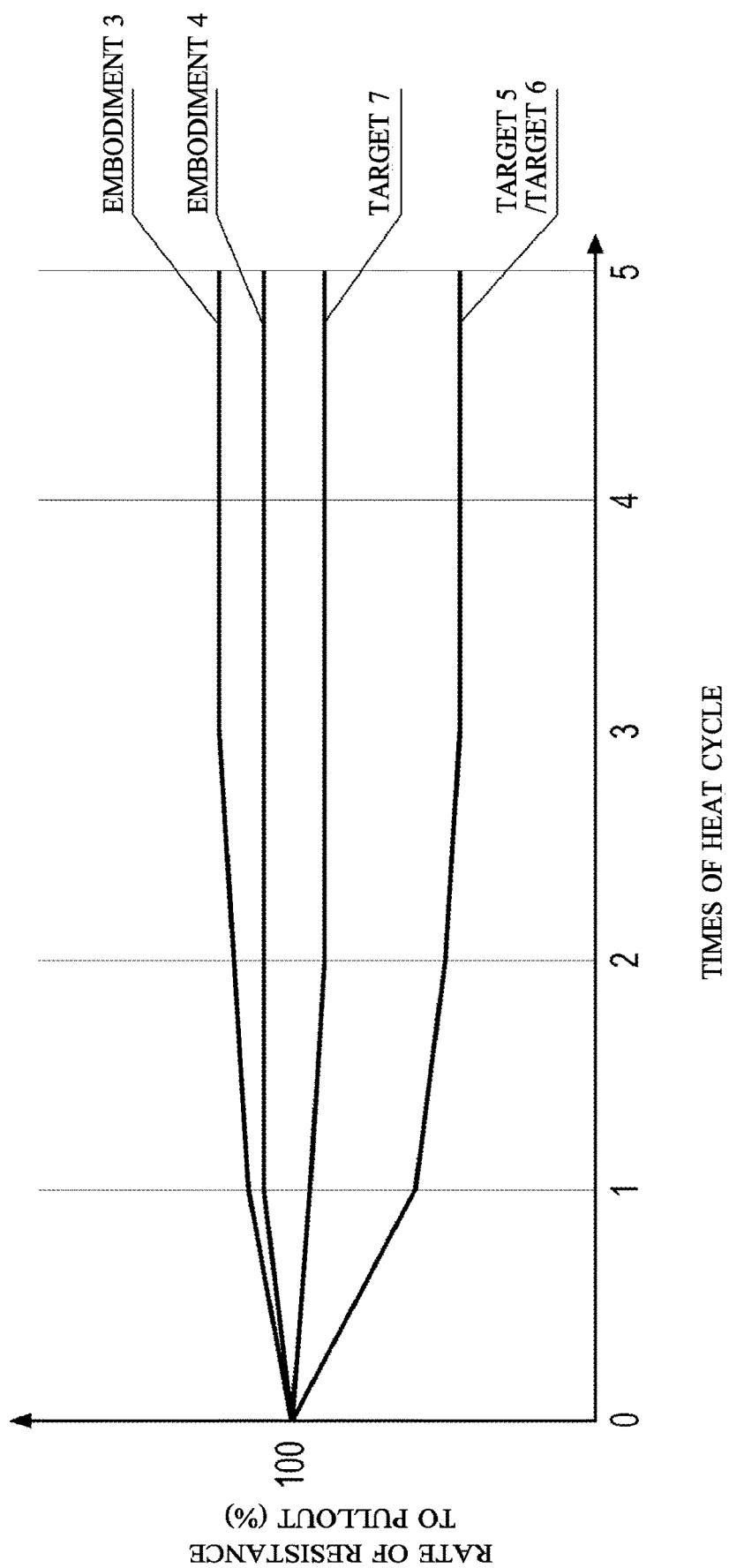

RESIN PIPE FITTING

TECHNICAL FIELD

The invention relates to resin tube fittings.

BACKGROUND ART

A kind of resin tube fittings is known, which is usable in manufacturing devices in technical fields of manufacture of semiconductors, medical devices, and drugs, food processing, and chemical industry. See, e.g., Patent Literature 1. The kind of resin tube fittings is used for connecting tubes for transporting fluid such as ultrapure water and chemicals to other tubes or devices; the fittings are designed to be coupled to longitudinal ends of the tubes.

Such a resin tube fitting has a body, an inner ring, and a union nut; these components are used for connecting the fitting to a longitudinal end of the tube. The inner ring is pressed into the longitudinal end of the tube, and then inserted into the body together with the longitudinal end of the tube. The union nut holds the longitudinal end of the tube to prevent it from being pulled out from the body.

During use, the resin tube fitting often undergoes heat cycle, which is, for example, a temperature change from a room temperature, e.g. about 25 degrees Celsius, to a high temperature, e.g. about 200 degrees Celsius, and then return to the room temperature. After the fitting undergoes the heat cycle, the tube connected to the fitting tends to have less resistance to being pulled out from the body of the fitting, when receiving an unexpected pullout force. This is the reason that the fitting is required to have higher resistance to forces pulling out the tube from the fitting.

CITATION LIST

Patent Literature

Patent Literature 1: JP H10-54489 A

SUMMARY OF INVENTION

In view of the above-described problems, the invention aims at providing a resin tube fitting that can achieve higher resistance to forces pulling out a longitudinal end of the tube connected to the fitting.

A resin tube fitting according to the invention is a fitting connectable to a tube, while allowing a longitudinal end of the tube to be put therein. The fitting includes: a body including a sleeve that allows the longitudinal end of the tube to be put therein; an inner ring including a press-in portion that is configured to be pressed into the longitudinal end of the tube, and to be put inside the sleeve together with the longitudinal end of the tube in which the press-in portion is put; and a union nut including a connector that is configured to, aiming at connecting the longitudinal end of the tube to the body, be screwed to an outer periphery of the body to allow the longitudinal end of the tube to be put radially between the connector and the press-in portion of the inner ring when the press-in portion is put inside the sleeve of the body together with the longitudinal end of the tube. The inner ring and the union nut are made of resin, which has a property of contracting in response to change in ambient temperature. A radial contraction rate of the connector of the union nut is designed to be higher by 0.05% or more than that of the press-in portion of the inner ring.

With this structure, the fitting enables the connector of the union nut to radially contract greater than the press-in portion of the inner ring when the inner ring and the union nut are cooled after heated by heat transfer from fluid, i.e. when they have undergone the heat cycle, under the condition that the fitting is connected to the tube.

The inner diameter of the connector of the union nut is reduced greater than the outer diameter of the press-in portion of the inner ring when the resin tube fitting is connected to the tube. Thus, the fitting can increase the force to hold the tube, which is supported by the press-in portion from the inner radius, from the outer radius with the connector, which encloses the tube over the sleeve of the body.

When the tube receives a force pulling out the tube from the resin tube fitting, the fitting can increase a friction force between the tube and the sleeve of the body, which is pressed by the connector of the union nut toward the inner radius. As a result, the fitting can achieve a higher resistance to the force pulling out the tube from the fitting.

According to another aspect of the invention, the inner ring and the union nut may be made of the same kind of resin.

According to still another aspect of the invention, the inner ring and the union nut may be made of different kinds of resin.

According to a further aspect of the invention, the union nut has a pressing portion configured to, when the connector is screwed to the outer periphery of the sleeve, press the longitudinal end of the tube from an outer radius onto the press-in portion, which is put inside the sleeve together with the longitudinal end of the tube. The radial contraction rate of the pressing portion is designed to be higher than that of the press-in portion of the inner ring.

With this structure, the fitting enables the pressing portion of the union nut, like the connector thereof, to radially contract greater than the press-in portion of the inner ring when the inner ring and the union nut are cooled after heated by heat transfer from fluid.

The inner diameter of the pressing portion of the union nut is reduced greater than the outer diameter of the press-in portion of the inner ring when the resin tube fitting is connected to the tube. Thus, the fitting can increase the force to hold the longitudinal end of the tube, which is supported by the press-in portion from the inner radius, from the outer radius with the pressing portion, which radially encloses the tube.

When the tube receives a force pulling out the tube from the resin tube fitting, the fitting can increase a friction force between the tube and the pressing portion of the union nut; the friction force appears outside the body. As a result, the fitting can achieve a higher resistance to the force pulling out the tube from the fitting.

The invention can provide the resin tube fittings achievable higher resistance to the force pulling out from the fitting the longitudinal end of the tube, which is connected to the fitting.

BRIEF DESCRIPTION OF DRAWINGS

FIG. 2 is a drawing showing sizes of portions of inner rings and union nuts in examples 1 and 2 according to the first embodiment of the invention;

FIG. 3 is a drawing showing sizes of portions of inner rings and union nuts in targets 1, 2, 3, and 4 for comparison with the first embodiment of the invention;

FIG. 4 is a drawing showing contraction rates of inner rings and union nuts of examples 1 and 2, and targets 1, 2, 3, and 4, based on FIGS. 2 and 3;

FIG. 7 is a drawing showing sizes of portions of inner rings and union nuts in examples 3 and 4 according to the second embodiment of the invention;

FIG. 8 is a drawing showing sizes of portions of inner rings and union nuts in targets 5, 6, and 7 for comparison with the second embodiment of the invention;

FIG. 9 is a drawing showing contraction rates of inner rings and union nuts of examples 3 and 4, and targets 5, 6, and 7, based on FIGS. 7 and 8;

FIG. 10 is a drawing showing resistances to the force pulling out the tube in embodiments 3 and 4, and targets 5, 6, and 7.

DESCRIPTION OF EMBODIMENTS

The first embodiment of the invention will be explained with reference to the drawings.

Figure 1:
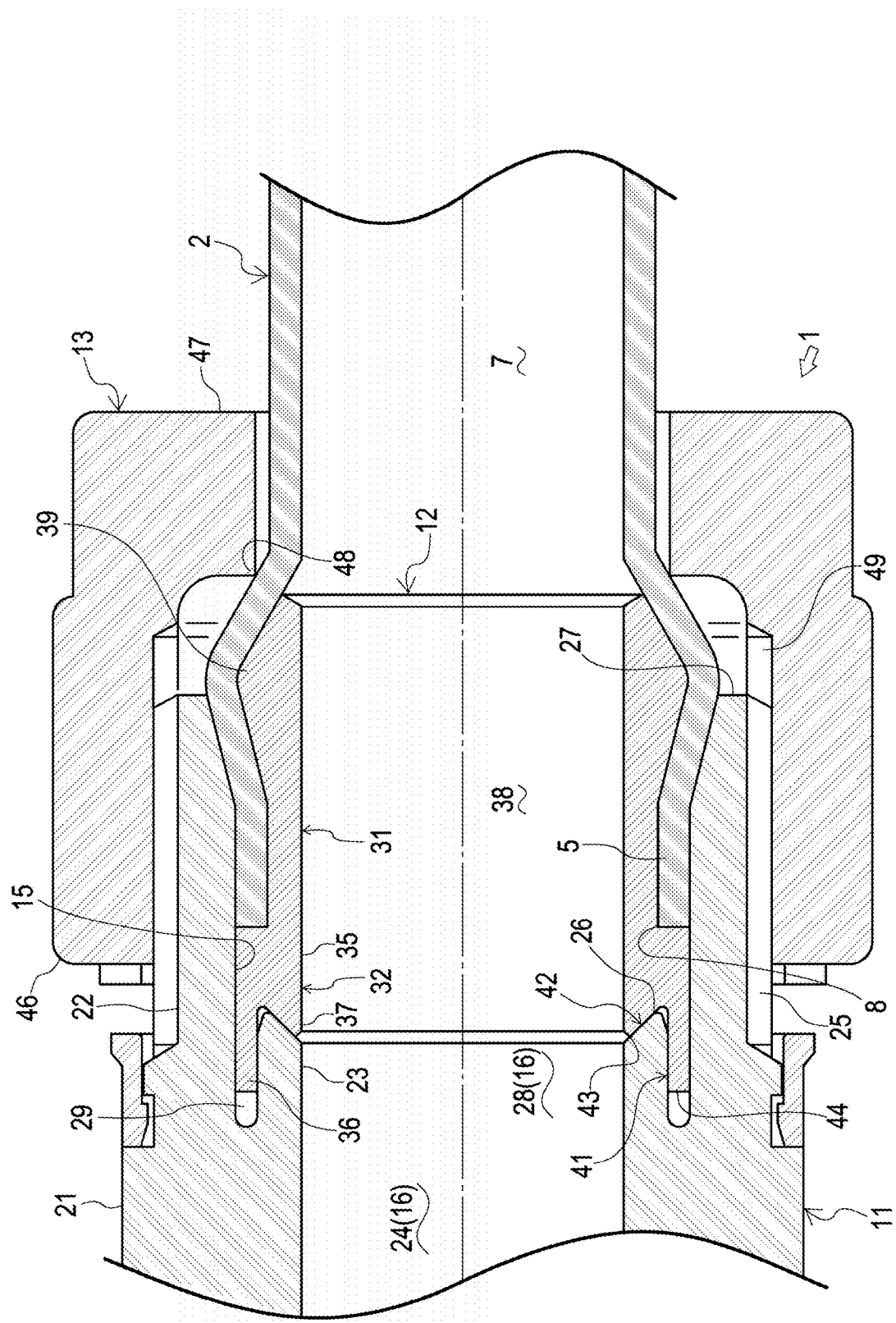
FIG. 1 is a cross-section view of the structure of a joint between a resin tube fitting according to the first embodiment of the invention and a longitudinal end of the tube.

A resin tube fitting 1 according to the first embodiment of the invention is usable in equipment of manufacture of semiconductor, liquid crystal, or organic electroluminescence devices. When used in such equipment, the fitting 1 is designed to be connectable to a tube 2, as shown in FIG. 1, to connect the tube 2 to another tube or a fluid device such as a valve and a pump.

The fitting 1 is connectable to the tube 2, while allowing a longitudinal end 5 of the tube 2 to be put inside the fitting 1. The fitting 1 has a body 11, an inner ring 12, and a union nut 13. The tube 2 is a flexible cylinder with approximately constant inner diameters. The tube 2 is made of resin such as fluoropolymers.

Hereinafter, a first axial direction means a direction to the tube 2 in the fitting 1 shown in FIG. 1, and a second axial direction means a direction to the body 11 in the fitting 1 shown in FIG. 1.

The body 11 has a sleeve, which is an outer sleeve 22 described below; the sleeve allows the longitudinal end 5 of the tube 2 to be put therein. The body 11 also has a fluid channel 16, which is provided inside of the body 11 to be connected to a fluid channel 7 of the tube 2 when the longitudinal end 5 of the tube 2 is put inside (an inlet 15 of) the sleeve 22.

The body 11 is made of certain resin, preferably, fluoropolymers such as perfluoroalkoxy alkanes (PFA), polytetrafluoroethylenes (PTFE), and ethylene tetrafluoroethylenes (ETFE).

The body 11 includes a main sleeve 21, an outer sleeve 22, and an inner sleeve 23. The main sleeve 21 has a cylinder-shaped portion and a first fluid channel 24, which is connectable to the fluid channel 7 of the tube 2. The first fluid channel 24 has an approximately circular cross section and runs inside the main sleeve 21 along its axis to serve as a part of the fluid channel 16.

The outer sleeve 22 has a thread engageable with the union nut 13 and protrudes coaxially from a first axial end of the main sleeve 21 to the first axial direction to form the inlet 15. The outer sleeve 22 is shaped as a cylinder with the inlet 15 inside. The thread, or external thread 25, extends at an outer periphery of the outer sleeve 22 along its axis.

The inner sleeve 23 is disposed at inner radiuses of the outer sleeve 22. The inner sleeve 23 has a tip 26, which protrudes coaxially from the first axial end of the main sleeve 21 to the same direction as the outer sleeve 22, i.e. to the first axial direction of the main sleeve 21, such that the tip 26 of the inner sleeve 23 is located nearer to the main sleeve 21 than a tip 27 of the outer sleeve 22.

The inner sleeve 23 is shaped as a cylinder that has approximately the same inner diameter as the main sleeve 21 and an outer diameter smaller than the inner diameter of the outer sleeve 22. The inner sleeve 23 also has a second fluid channel 28 connectable to the fluid channel 7 of the tube 2. The second fluid channel 28 has an approximately circular cross section and runs coaxially with the first fluid channel 24 to form the fluid channel 16 together with the first fluid channel 24.

The body 11 includes a groove 29 that is surrounded by the main sleeve 21, outer sleeve 22, and inner sleeve 23 to be open to the first axial direction. The groove 29 is shaped as a ring along the whole circumference of the outer periphery of the inner sleeve 23 to allow a second axial end of the inner ring 12, which is a plug 36, to be pressed into the groove 29.

The inner ring 12 has a press-in portion 31 that can be pressed into the first longitudinal end 5 of the tube 2. The press-in portion 31 is provided to be insertable into the inlet 15 of the outer sleeve 22, i.e. inside the body 11, together with the longitudinal end 5 of the tube 2 with an opening 8 inside which the press-in portion 31 is placed.

In addition to the press-in portion 31, the inner ring 12 has an insert portion 32 insertable into the inlet 15 of the body 11. The insert portion 32 includes a cylinder 35, a plug 36, and a connector 37. The inner ring 12 has a fluid channel 38 that can connect the fluid channel 7 of the tube 2 with the fluid channel 16 of the body 11.

In detail, the press-in portion 31 has the same (cylindrical) shape as the inner periphery of the longitudinal end 5 of the tube 2 enlarged by the press-in portion 31, which is disposed on the first axial side of the inner ring 12. The press-in portion 31 has the same inner diameter as the tube 2 (which is not enlarged by the press-in portion. Hereinafter, the same is true.) The press-in portion 31 encloses the first axial side of the fluid channel 38, which has an approximately circular cross section.

The press-in portion 31 has an outer diameter larger than the inner diameter of the tube 2. The press-in portion 31 is placed in contact with the whole circumference of the inner periphery of the longitudinal end 5 of the tube 2. The press-in portion 31 is pressed into the opening 8 of the longitudinal end 5 to enlarge it. The press-in portion 31 is held at a certain position relative to the longitudinal end 5.

While put inside the longitudinal end 5 of the tube 2, the press-in portion 31 is inserted into the inlet 15 of the outer sleeve 22, i.e. inside of the body 11, from the second axial side of the press-in portion 31, together with the longitudinal end 5 of the tube 2.

When put inside the inlet 15 of the outer sleeve 22, the press-in portion 31 presses the longitudinal end 5 of the tube 2 onto the outer sleeve 22. In other words, the press-in portion 31 is placed in contact with the whole circumference and axial length of the longitudinal end 5 of the tube 2 from an inner radius, and in parallel, the outer sleeve 22 is placed in contact with the whole circumference and axial length of the longitudinal end 5 of the tube 2 from an outer radius.

The press-in portion 31 has an expanded portion 39, which is an annular protruding portion to improve seal performance between the press-in portion 31 and the tube 2 and prevent the tube 2 from being pulled out when the press-in portion 31 is put inside the longitudinal end 5 of the tube 2. The expanded portion 39 expands to outer radiuses of the inner ring 12 on the first axial side of the press-in portion 31.

The expanded portion 39 has a convex cross section with first and second outer peripheries, which are shaped as taper surfaces, placed respectively at the first and second axial sides of the peak of the convex profile, i.e. a position of its largest radius. When the press-in portion 31 is pressed into the outer sleeve 22, the second outer periphery of the expanded portion 39 presses the first axial side of the longitudinal end 5 of the tube 2 onto the outer sleeve 22.

When the press-in portion 31 is pressed into the longitudinal end 5 of the tube 2, the insert portion 32 is placed outside the tube 2. The insert portion 32 is shaped as a cylinder and disposed on the second axial side of the inner ring 12. The insert portion 32 has approximately the same inner diameter as the press-in portion 31 and encloses the second axial side of the fluid channel 38.

The insert portion 32 has a diameter generally larger than the press-in portion 31. When the press-in portion 31 is to be inserted into the inlet 15 of the outer sleeve 22 together with the longitudinal end 5 of the tube 2, the insert portion 32 is inserted into the inlet 15 of the outer sleeve 22 before the press-in portion 31, and the whole circumference and axial length of the insert portion 32 contacts the outer sleeve 22 from an inner radius.

In the insert portion 32, the cylinder 35 is shaped as a circular cylinder and aligned coaxially with the second axial end of the press-in portion 31. The cylinder 35 has approximately the same inner diameter as the press-in portion 31 and the tube 2. The cylinder 35 includes a fluid channel that is a part of the second axial end of the fluid channel 38.

The cylinder 35 has an outer diameter larger than the press-in portion 31 (except for the peak of the expanded portion 39 and its vicinity.) When the insert portion 32 is inserted into the inlet 15 of the outer sleeve 22, the cylinder 35, in particular its whole periphery and axial length, approaches, contacts, or presses the outer sleeve 22 from an inner radius.

The plug 36 is shaped as a cylinder to be pressed in the groove 29 of the body 11 and protrudes from the cylinder 35 coaxially in the second axial direction. The inner diameter of the plug 36 is slightly smaller than the outer diameter of the inner sleeve 23 of the body 11, and the outer diameter of the plug 36 is approximately the same or slightly larger than that of the cylinder 35.

When the insert portion 32 is put inside the inlet 15 of the outer sleeve 22, the plug 36 is pressed in the groove 29, and presses the inner sleeve 23 from an outer radius to form a first seal area 41 between the plug 36 and the inner sleeve 23. In particular, the whole periphery and axial length of the plug 36 contacts the inner sleeve 23.

In parallel, the plug 36 contacts or presses the outer sleeve 22 from an inner radius. In particular, the whole periphery and axial length of the plug 36 contacts the outer sleeve 22.

The connector 37 is shaped as a cylinder and disposed at a radius smaller than the plug 36. The connector 37 protrudes coaxially from the cylinder 35 in the same direction as the plug 36 (i.e. in the second axial direction from the cylinder 35) to locate the tip 43 of the connector 37 nearer to the cylinder 35 than the tip 44 of the plug 36.

The connector 37 is shaped as a circular cylinder of approximately the same inner diameter as the cylinder 35 and the inner sleeve 23 of the body 11. The connector 37 has an outer diameter smaller than the inner diameter of the plug 36 to allow the tip 26 of the inner sleeve 23 to be placed between the connector 37 and the first axial end of the plug 36.

The connector 37, while restricting deformation and movement of the inner sleeve 23 toward inner radiuses caused by the plug 36 pressed into the groove 29, presses the inner sleeve 23 from the first axial direction to form a second seal area 42 between the connector 37 and the inner sleeve 23. The whole periphery of the connector 37 contacts the inner sleeve 23.

The union nut 13 has a connector 46, which can be screwed to an outer periphery of the body 11 to allow the longitudinal end 5 of the tube 2 to be put radially between the connector 46 and the press-in portion 31. Since the press-in portion 31 is put inside the inlet 15 together with the longitudinal end 5 of the tube 2, the connector 46 connects the longitudinal end 5 of the tube 2 to the body 11.

The union nut 13 has a pressing portion 47 in addition to the connector 46. The union nut 13 has a through hole along the axis of the union nut 13; the hole allows the tube 2 to penetrate therethrough. There is an allowance between the hole and the tube 2 so that, with the tube 2 put inside the hole, the union nut 13 can move relative to the tube 2 in the longitudinal direction of the tube 2.

The connector 46 includes, in addition to a part of the hole, a thread engageable with the thread of the outer sleeve 22 of the body 11, i.e. the external thread 25. The connector 46 is shaped as a cylinder and disposed on the second axial side of the union nut 13. The thread of the connector 46, or internal thread 49, extends on the inner periphery of the connector 46 along its axial direction to be engaged with the thread of the outer sleeve 22 of the body 11.

When the internal thread 49 is engaged with the external thread 25 of the outer sleeve 22 of the body 11 and then moves to the second axial direction, the connector 46 radially encloses the outer sleeve 22 and presses the outer sleeve 22 and the longitudinal end 5 of the tube 2 onto the press-in portion 31 of the inner ring 12; the longitudinal end 5 of the tube 2, together with the press-in portion 31, is placed inside the outer sleeve 22.

At that time, the connector 46 contacts the outer sleeve 22 in the whole periphery of an engagement area, in which the internal thread 49 is engaged with the external thread 25 of the outer sleeve 22. The connector 46 radially encloses the longitudinal end 5 of the tube 2, which is placed inside the inlet 15 of the outer sleeve 22, across the engagement area of the outer sleeve 22.

When the connector 46 is screwed to the external thread 25 of the outer sleeve 22, the pressing portion 47 presses the longitudinal end 5 of the tube 2, not only from the first axial direction onto the body 11, but also from an outer radius onto the press-in portion 31, which is put inside the inlet 15 together with the longitudinal end 5 of the tube 2.

The pressing portion 47 is shaped as a cylinder and disposed on the first axial side of the union nut 13. The pressing portion 47 is aligned coaxially with the connector 46 so that the inner periphery of the pressing portion 47 is located radially inside the inner periphery of the connector 46. The pressing portion 47 has an inner diameter smaller than the inner radius of the connector 46 and slightly larger than the outer diameter of the tube 2; the pressing portion 47 thus includes a residual part of the through hole.

When the connector 46 presses the outer sleeve 22 and the longitudinal end 5 of the tube 2, which is placed inside the outer sleeve 22 together with the press-in portion 31 of the inner ring 12, onto the press-in portion 31, the pressing portion 47 is disposed outside the first axial end of the outer sleeve 22 and can press the longitudinal end 5 of the tube 2 onto the press-in portion 31.

In detail, the inner periphery of the pressing portion 47 has a corner 48 on the second axial side. When the connector 46 is screwed to the external thread 25 of the outer sleeve 22, the corner 48 presses the longitudinal end 5 of the tube 2 not only from the first axial direction onto the body 11, but also from the outer radius onto the press-in portion 31. In short, the corner 48 holds the longitudinal end 5 of the tube 2 between the corner 48 and the press-in portion 31.

When the connector 46 is screwed to the external thread 25 of the outer sleeve 22, i.e. when the union nut 13 is being fixed to the body 11 tightly, the corner 48 moves in the axial direction and presses an enlarged portion of the tube 2, like a wedge driven in the whole periphery of the enlarged portion; the enlarged portion of the tube 2 is enlarged by the expanded portion 39 and extends along the first outer periphery.

The resin tube fitting 1 is formed with the above-described configuration. When the resin tube fitting 1 is to be connected to the tube 2, first, the union nut 13 makes the tube 2 penetrate with an allowance between the union nut 13 and the tube 2. Next, the inner ring 12 is connected to the tube 2. More specifically, the press-in portion 31 is pressed coaxially into the opening 8 of the longitudinal end 5 of the tube 2, while the expanded portion 39 enlarges the tube 2.

The insert portion 32 of the inner ring 12, which is located outside the tube 2, is then inserted into the inlet 15 of the outer sleeve 22, i.e. the inside of the resin tube fitting 1. Next, the press-in portion 31 and the longitudinal end 5 of the tube 2, inside which the press-in portion 31 is placed, are inserted into the inlet 15 of the outer sleeve 22. Finally, the connector 46 of the union nut 13 is screwed to the external thread 25 of the outer sleeve 22 and placed at a predetermined position near the body 11.

The union nut 13 is screwed such that the plug 36 can be pressed into the groove 29 to form the first seal area 41 with the radial sealing action, and the connector 37 can be pressed onto the inner sleeve 23 to form the second seal area 42 with the axial sealing action.

In addition, the inner ring 12 and the union nut 13 of the resin tube fitting 1 are made of the same kind of resins, which has a property of contracting in response to change in ambient temperature. A radial contraction rate of the connector 46 of the union nut 13 is designed to be higher by 0.05% or more than that of the press-in portion 31 of the inner ring 12.

The inner ring 12 and the union nut 13 are made of certain resin, which is preferably fluoropolymer including, for example, PFA and PTFE.

The inner ring 12 is heated by rise in ambient temperatures (including the temperature of fluid flowing inside the resin tube fitting 1) from a room temperature (approximately 25 degrees Celsius) by certain degrees, and then cooled by fall in ambient temperature to the room temperature. When undergoing such a temperature change for the first time, the press-in portion 31 can radially contract relative to its initial size.

The union nut 13 is heated by rise in ambient temperature (including the temperature of fluid flowing inside the resin tube fitting 1) from a room temperature by certain degrees, and then cooled by fall in ambient temperature to the room temperature. When undergoing such a temperature change for the first time, the connector 46 can radially contract relative to its initial size.

In this case, the connector 46 of the union nut 13 is designed to radially contract greater than the press-in portion 31 of the inner ring 12. Note that the pressing portion 47 also radially contracts relative to its initial size, when undergoing the temperature change, as described below.

The press-in portion 31 of the inner ring 12 and the connector 46 of the union nut 13 can have different radial contraction rates, whose difference within a certain range can be based on, for example, whether the inner ring 12 and the union nut 13 are heat-treated during manufacture or not.

The heat treatment is, for example, an annealing treatment to eliminate internal distortion from objects molded during manufacture of the inner ring 12 or the union nut 13. In the annealing treatment, the objects are heated at a certain temperature for a certain time (e.g., the objects made of PFA or PTFE are heated from about 200 degrees Celsius to about 250 degrees Celsius for about 180 minutes; the objects made of ETFE are heated from about 120 degrees Celsius to about 140 degrees Celsius for about 180 minutes.)

The press-in portion 31 of the inner ring 12 is heat-treated to have the contraction rate of approximately zero after the temperature change, i.e. to hardly contract. The connector 46 of the union nut 13, in addition to the pressing portion 47 thereof, are not heat-treated to have contraction rates after the temperature change higher than the press-in portion 31 of the inner ring 12.

The method of generating the difference in radial contraction rate between the press-in portion 31 of the inner ring 12 and the connector 46 of the union nut 13 is not limited to the method in which one of the inner ring 12 and the union nut 13 is heat-treated but the other is not. For example, conditions may be appropriately adjusted during molding of the inner ring 12 and the union nut 13. In injection molding, different conditions such as injection pressure, holding pressure, injection rate, and mold temperature can vary properties of molded objects such as its residual stress and density, and can cause different contraction rate of the objects. Accordingly, molding conditions different between the inner ring 12 and the union nut 13 can generate a significant difference in contraction rate therebetween, or difference of 0.05% or more. The same is true for the method of generating difference in radial contraction rate between the press-in portion 31 of the inner ring 12 and the pressing portion 47 of the union nut 13 described below.

The difference in radial contraction rate between the press-in portion 31 of the inner ring 12 and the connector 46 of the union nut 13 is designed within a range from about 0.05% to about 10%. Preferably, the difference is selected within a range from about 0.05% to about 5%. The same is true for the difference in radial contraction rate between the press-in portion 31 of the inner ring 12 and the pressing portion 47 of the union nut 13 described below.

The above-described configuration enables the connector 46 of the union nut 13 to contract greater than the press-in portion 31 of the inner ring 12 when the inner ring 12 and the union nut 13, with the tube 2 connected to the resin tube fitting 1, are cooled after heated by heat transmitted from the fluid, i.e. have undergone the heat cycle.

Since the inner diameter of the connector 46 of the union nut 13 is reduced greater than the outer diameter of the press-in portion 31 of the inner ring 12, the resin tube fitting 1 can, when connected to the tube 2, increase the force to hold the longitudinal end 5 of the tube 2, which is supported by the press-in portion 31 from the inner radius, from the outer radius with the connector 46, which radially encloses the tube 2 across the outer sleeve 22.

When the tube 2 receives a force pulling out the tube 2 from the resin tube fitting 1, the fitting 1 can increase a friction force between the tube 2 and the outer sleeve 22, which is pressed toward inner radiuses by the connector 46 of the union nut 13. As a result, the resin tube fitting 1 can achieve a higher resistance to the force pulling out the tube 2 from the fitting 1.

The union nut 13 has the pressing portion 47, which has a radial contraction rate higher than the press-in portion 31 of the inner ring 12. Accordingly, the inner diameter of the pressing portion 47 of the union nut 13, like that of the connector 46, is reduced greater than the outer diameter of the press-in portion 31 of the inner ring 12. Thus, the fitting 1 can increase the force to hold the longitudinal end 5 of the tube 2 from the outer radius with the pressing portion 47, or more specifically with the corner 48.

When the tube 2 receives a force pulling out the tube 2 from the resin tube fitting 1, the fitting 1 can increase a friction force between the tube 2 and the pressing portion 47 of the union nut 13; the friction force appears outside the body 11. As a result, the fitting 1 can achieve a higher resistance to the force pulling out the tube 2 from the fitting 1.

The above-described advantageous effects were confirmed by comparative experiments about resistance to the force pulling out the tube. We started the comparative experiments by preparing examples 1 and 2 of the first embodiment of the invention and targets 1, 2, 3, and 4 for comparison, which have the same structure as the resin tube fitting 1, but the inner rings and union nuts differ in difference in contraction rate from those according to the first embodiment of the invention.

Ambient temperatures of the examples 1 and 2 and the targets 1-4 were increased from a room temperature to about 200 degrees Celsius, and then kept at about 200 degrees Celsius for 1 hour. After that, the ambient temperatures were decreased from about 200 degrees Celsius to a room temperature, i.e. the examples 1 and 2 and the targets 1-4 are naturally cooled.

The heating and natural cooling were conducted for the examples 1 and 2 and the targets 1-4 before connected to tubes, i.e. with the inner rings and union nuts separated from each other and the bodies of the fittings.

FIGS. 2 and 3 show the outer diameters of the press-in portions of the inner rings of the examples 1 and 2 and the targets 1-4, and the inner diameters of the connectors and pressing portions of the union nuts thereof, which were measured before and after the temperature change, i.e. the heating. FIGS. 2 and 3 also show calculated values of the radial contraction rates of the press-in portions, connectors, and pressing portions.

FIG. 4 shows differences that are equal to the radial contraction rates of the connectors of the union nuts minus the radial contraction rates of the press-in portions of the inner rings. FIG. 4 also shows differences that are equal to the radial contraction rates of the pressing portions of the union nuts minus the radial contraction rates of the press-in portion of the inner rings.

The example 1 has the inner ring made of PFA and the union nut made of PFA. The inner ring of the example 1 was formed such that its press-in portion does not contract after the heating, and the union nut thereof was formed such that its connector radially contracts and its pressing portion contracts after the heating.

As a result, the connector of the union nut has a radial contraction rate 0.50% higher than the press-in portion of the inner ring, and the pressing portion of the union nut has a radial contraction rate 0.11% higher than the press-in portion of the inner ring.

The example 2 has the inner ring made of PTFE and the union nut made of PTFE. The inner ring of the example 2 was formed such that its press-in portion does not contract after the heating, and the union nut thereof was formed such that its connector and pressing portion contract after the heating.

As a result, the connector of the union nut has a radial contraction rate 0.07% higher than the press-in portion of the inner ring, and the pressing portion of the union nut has a radial contraction rate 0.05% higher than the press-in portion of the inner ring.

The target 1 has the inner ring made of PFA and the union nut made of PFA. The inner ring of the target 1 was formed such that its press-in portion does not contract after the heating, and the union nut thereof was formed such that its connector and pressing portion do not contract after the heating.

As a result, the connector of the union nut has the same radial contraction rate as the press-in portion of the inner ring, and the pressing portion of the union nut has the same radial contraction rate as the press-in portion of the inner ring.

The target 2 has the inner ring made of PFA and the union nut made of PFA. The inner ring of the target 2 was formed such that its press-in portion contracts after the heating, and the union nut thereof was formed such that its connector and pressing portion contract after the heating.

As a result, the connector of the union nut has a radial contraction rate 0.04% lower than the press-in portion of the inner ring, and the pressing portion of the union nut has a radial contraction rate 0.43% lower than the press-in portion of the inner ring.

The target 3 has the inner ring made of PTFE and the union nut made of PTFE. The inner ring of the target 3 was formed such that its press-in portion does not contract after the heating, and the union nut thereof was formed such that its connector and pressing portion do not contract after the heating.

As a result, the connector of the union nut has the same radial contraction rate as the press-in portion of the inner ring, and the pressing portion of the union nut has the same radial contraction rate as the press-in portion of the inner ring.

The target 4 has the inner ring made of PTFE and the union nut made of PTFE. The inner ring of the target 4 was formed such that its press-in portion contracts after the heating, and the union nut thereof was formed such that its connector and pressing portion contract after the heating.

As a result, the connector of the union nut has a radial contraction rate 0.02% higher than the press-in portion of the inner ring, and the pressing portion of the union nut has the same radial contraction rate as the press-in portion of the inner ring.

A tube made of PFA was connected to each body of the examples 1 and 2 and the targets 1-4 by the inner ring and union nut, and then, the tube, body, inner ring and union nut underwent the heat cycle (change from a room temperature to a high temperature (about 200 degrees Celsius) and return to the room temperature.) Before and after the heat cycle, rates of resistance to pulling out the tube were measured.

The rates of resistance to pulling out the tube were obtained by comparison among measured values of resistances to pulling out the tube after the zeroth to fifth times of the heat cycle. More specifically, the rates are defined as the measured values of resistances after the first to fifth times of the heat cycle divided by the measured value of resistance before the heat cycle, i.e. after the zeroth time of the heat cycle.

Figure 5:
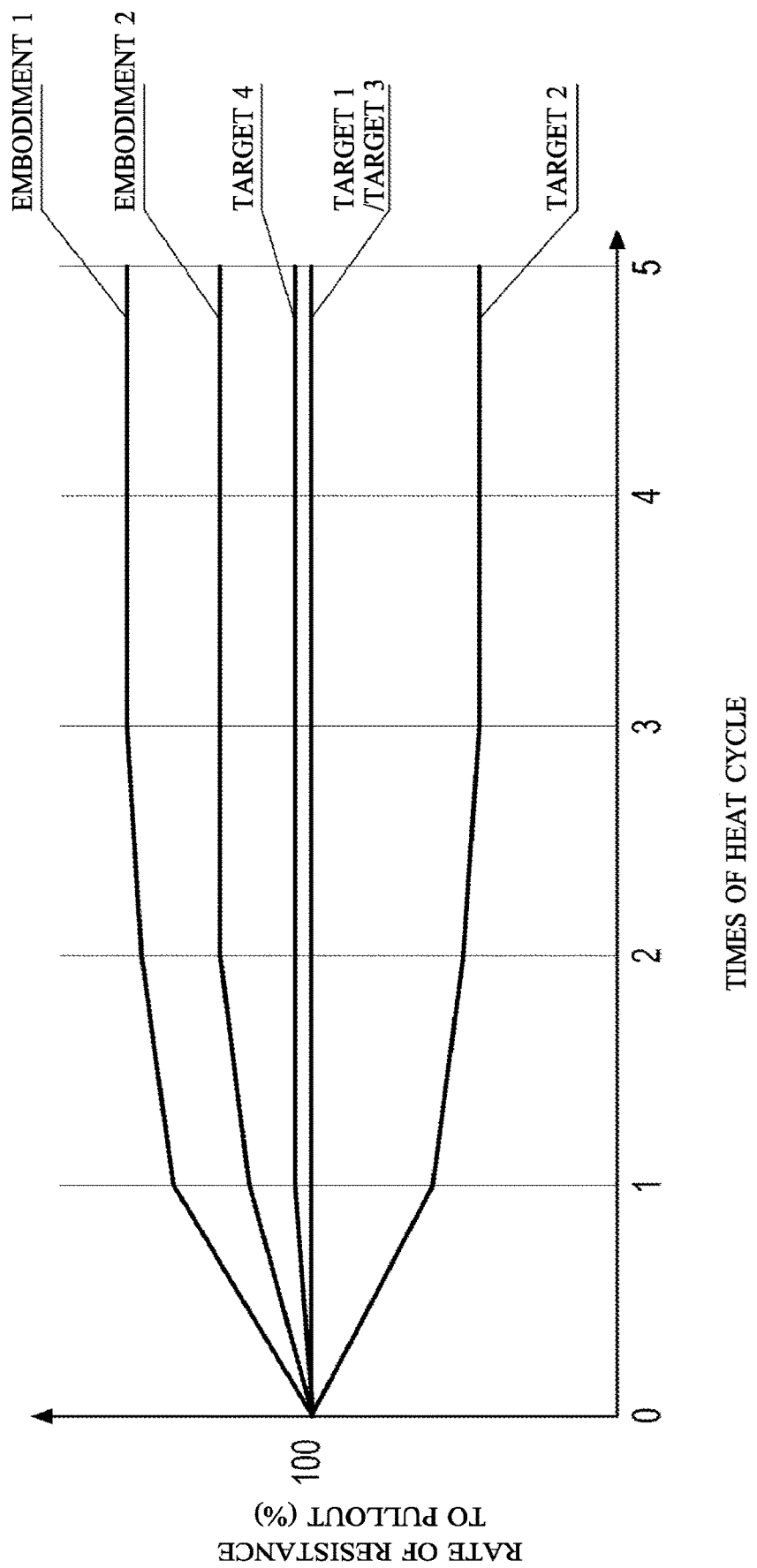
FIG. 5 is a drawing showing resistances to the force pulling out the tube in embodiments 1 and 2, and targets 1, 2, 3, and 4.

The measured values shown in FIG. 5 reveals that the rates of resistance to pulling out the tube in the examples 1 and 2 are higher than those in the targets 1-4. In other words, the measured values clarify that the first embodiment of the invention has an effect of enhancing the resistance to pulling out the tube from the fitting even if the fitting undergoes the heat cycle repeatedly.

The following will explain a second embodiment of the invention with reference to drawings.

Figure 6:
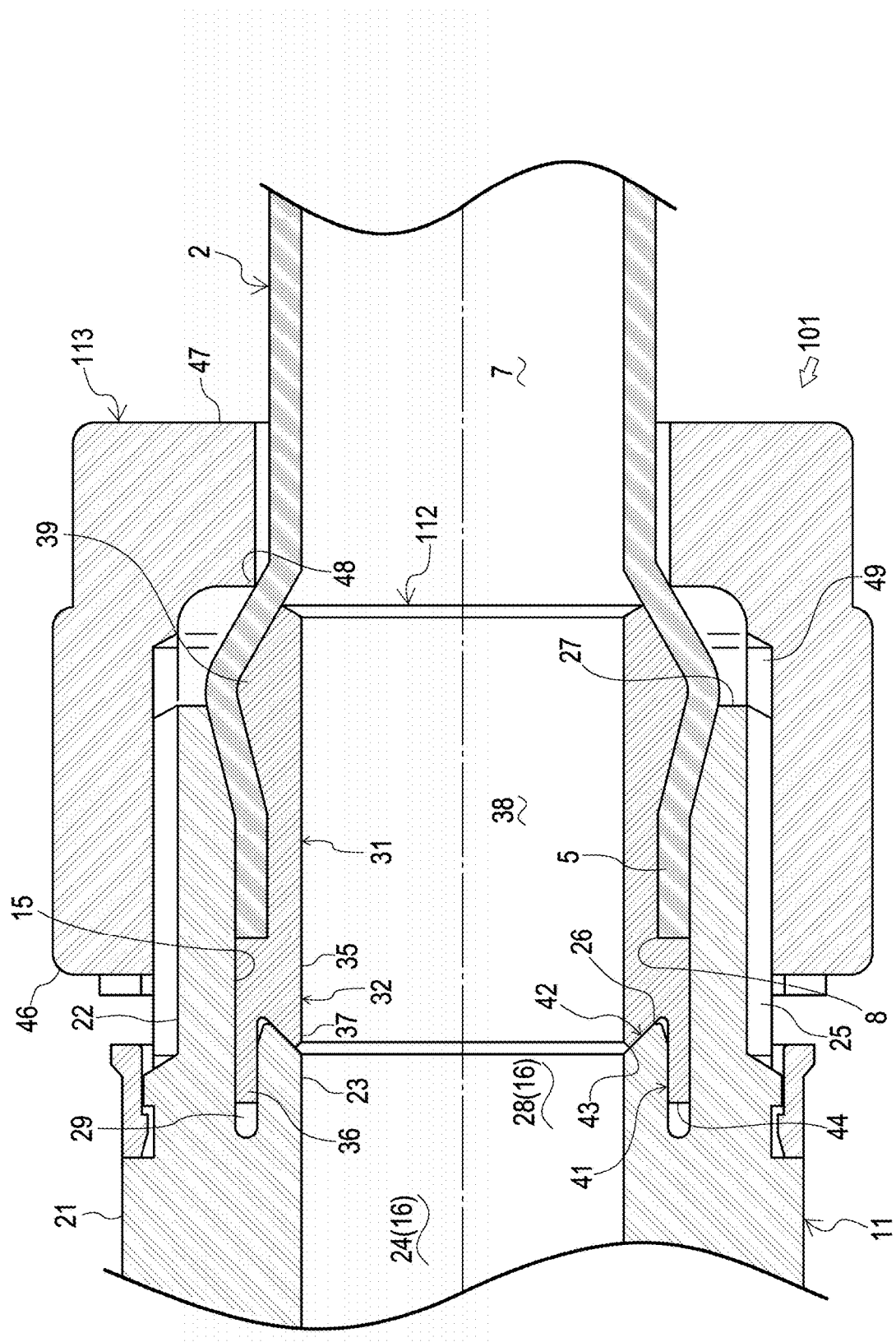
FIG. 6 is a cross-section view of the structure of a joint between a resin tube fitting according to the second embodiment of the invention and a longitudinal end of the tube.

A resin tube fitting 101 according to the second embodiment of the invention differs from the fitting 1 according to the first embodiment in that the inner ring 112 and the union nut 113 are made from different kinds of resin. Except for the difference, the resin tube fitting 101 according to the second embodiment is substantially the same as the fitting 1 according to the first embodiment. Accordingly, as shown in FIG. 6, components of the resin tube fitting 101 are marked with the same reference symbols as substantially equivalent components of the resin tube fitting 1 according to the first embodiment, and details of the components are omitted.

The resin tube fitting 101 has the inner ring 112 and the union nut 113 that are made of different kinds of resin, which have a property of contracting caused by change in ambient temperature. The connector 46 of the union nut 113 is designed to have a radial contraction rate higher by 0.05% or more than the press-in portion 31 of the inner ring 112. In other words, the resin from which the union nut 113 is made has a contraction rate after molded higher than the resin from which the inner ring 112 is made.

The different kinds of resin have different names, or alternatively the same name but different grades. Since resins of different grades have different molecular structures, molecular weights, or crystallinity degrees, the resins can have different melt flow rates (MFRs) at molding, flexing lives (resistances to bending) after molded, and the likes, which can cause difference in contraction rate of molded objects. Thus, the inner ring 112 and the union nut 113 made from resins of different grades can have contraction rates with significant difference, i.e. 0.05% or more.

The inner ring 112 and the union nut 113 are made from their respective resins, preferably fluoropolymers, which include, for example, PFA, PTFE, and ETFE.

The inner ring 112 is heated by rise in ambient temperatures (including the temperature of fluid flowing inside the resin tube fitting 101) from a room temperature (approximately 25 degrees Celsius) by certain degrees, and then cooled by fall in ambient temperature to the room temperature. When undergoing such a temperature change for the first time, the press-in portion 31 can radially contract relative to its initial size.

The union nut 113 is heated by rise in ambient temperature (including the temperature of fluid flowing inside the resin tube fitting 101) from a room temperature by certain degrees, and then cooled by fall in ambient temperature to the room temperature. When undergoing such a temperature change for the first time, the connector 46 can radially contract relative to its initial size.

In detail, the inner ring 112 and the union nut 13, including the press-in portion 31 and the connector 46, expand relative to their initial sizes during heating, i.e. when they receive a certain amount of heat due to rise in ambient temperature, and then contract relative to their initial sizes during cooling, i.e. when they lose heat due to fall in ambient temperature.

The connector 46 of the union nut 113 is designed to radially contract greater than the press-in portion 31 of the inner ring 112.

Since the inner ring 112 and the union nut 113 are made from different kinds of resin, the press-in portion 31 of the inner ring 112 and the connector 46 of the union nut 113 can have radial contraction rates with a certain difference. In addition, heat treatment or adjustment of molding conditions may increase the difference in contraction rate. Concretely, the inner ring 112 may undergo heat treatment such that it has zero contraction rate after the temperature change, i.e. hardly contract. The same is true for a mean providing difference within a certain range between the radial contraction rates of the press-in portion 31 of the inner ring 112 and the pressing portion 47 of the union nut 113, as described below.

The heat treatment is, for example, an annealing treatment to eliminate internal distortion from objects molded during manufacture of the inner ring 112. In the annealing treatment, the objects are heated at a certain temperature for a certain time (e.g., the objects made of PFA or PTFE are heated from about 200 degrees Celsius to about 250 degrees Celsius for about 180 minutes; the objects made of ETFE are heated from about 120 degrees Celsius to about 140 degrees Celsius for about 180 minutes.)

The difference in radial contraction rate between the press-in portion 31 of the inner ring 112 and the connector 46 of the union nut 113 is designed within a range from about 0.05% to about 10%. Preferably, the difference is selected within a range from about 0.05% to about 5%. The same is true for the difference in radial contraction rate between the press-in portion 31 of the inner ring 112 and the pressing portion 47 of the union nut 113 described below.

The above-described configuration enables the connector 46 of the union nut 113 to contract greater than the press-in portion 31 of the inner ring 112 when the inner ring 112 and the union nut 113, with the tube 2 connected to the resin tube fitting 101, are cooled after heated by heat transmitted from the fluid, i.e. have undergone the heat cycle.

Since the inner diameter of the connector 46 of the union nut 113 is reduced greater than the outer diameter of the press-in portion 31 of the inner ring 112. the resin tube fitting 101 can, when connected to the tube 2, increase the force to hold the longitudinal end 5 of the tube 2, which is supported by the press-in portion 31 from the inner radius, from the outer radius with the connector 46, which radially encloses the tube 2 across the outer sleeve 22.

When the tube 2 receives a force pulling out the tube 2 from the resin tube fitting 101, the fitting 101 can increase a friction force between the tube 2 and the outer sleeve 22, which is pressed toward inner radiuses by the connector 46 of the union nut 113. As a result, the resin tube fitting 101 can achieve a higher resistance to the force pulling out the tube 2 from the fitting 101.

The union nut 113 has the pressing portion 47, which has a radial contraction rate higher than the press-in portion 31 of the inner ring 112. Accordingly, the inner diameter of the pressing portion 47 of the union nut 113, like that of the connector 46, is reduced greater than the outer diameter of the press-in portion 31 of the inner ring 112. Thus, the fitting 101 can increase the force to hold the longitudinal end 5 of the tube 2 from the outer radius with the pressing portion 47, or more specifically with the corner 48.

When the tube 2 receives a force pulling out the tube 2 from the resin tube fitting 101, the fitting 101 can increase a friction force between the tube 2 and the pressing portion 47 of the union nut 113; the friction force appears outside the body 11. As a result, the fitting 101 can achieve a higher resistance to the force pulling out the tube 2 from the fitting 101.

The above-described advantageous effects were confirmed by comparative experiments about resistance to the force pulling out the tube. We started the comparative experiments by preparing examples 3 and 4 of the second embodiment of the invention and targets 5, 6, and 7 for comparison, which have the same structure as the resin tube fitting 101, but the inner rings and union nuts differ in difference in contraction rate from those according to the second embodiment of the invention.

Ambient temperatures of the examples 3 and 4 and the targets 5-7 were increased from a room temperature to about 200 degrees Celsius, and then kept at about 200 degrees Celsius for 1 hour. After that, the ambient temperatures were decreased from about 200 degrees Celsius to a room temperature, i.e. the examples 3 and 4 and the targets 5-7 are naturally cooled.

The heating and natural cooling were conducted for the examples 3 and 4 and the targets 5-7 before connected to tubes, i.e. with the inner rings and union nuts separated from each other and the bodies of the fittings.

FIGS. 7 and 8 show the outer diameters of the press-in portions of the inner rings of the examples 3 and 4 and the targets 5-7, and the inner diameters of the connectors and pressing portions of the union nuts thereof, which were measured before and after the temperature change, i.e. the heating. FIGS. 7 and 8 also show calculated values of the radial contraction rates of the press-in portions, connectors, and pressing portions.

FIG. 9 shows differences that are equal to the radial contraction rates of the connectors of the union nuts minus the radial contraction rates of the press-in portions of the inner rings. FIG. 9 also shows differences that are equal to the radial contraction rates of the pressing portions of the union nuts minus the radial contraction rates of the press-in portion of the inner rings.

The example 3 has the inner ring made of PTFE and the union nut made of PFA. The connector of the union nut has a radial contraction rate 0.45% higher than the press-in portion of the inner ring, and the pressing portion of the union nut has a radial contraction rate 0.06% higher than the press-in portion of the inner ring.

The example 4 has the inner ring made of PTFE and the union nut made of ETFE. The connector of the union nut has a radial contraction rate 0.34% higher than the press-in portion of the inner ring, and the pressing portion of the union nut has a radial contraction rate 0.06% higher than the press-in portion of the inner ring.

The target 5 has the inner ring made of PFA and the union nut made of PFA. The connector of the union nut has a radial contraction rate 0.04% lower than the press-in portion of the inner ring, and the pressing portion of the union nut has a radial contraction rate 0.44% lower than the press-in portion of the inner ring.

The target 6 has the inner ring made of ETFE and the union nut made of ETFE. The connector of the union nut has a radial contraction rate 0.02% lower than the press-in portion of the inner ring, and the pressing portion of the union nut has a radial contraction rate 0.30% lower than the press-in portion of the inner ring.

The target 7 has the inner ring made of PTFE and the union nut made of PTFE. The connector of the union nut has a radial contraction rate 0.02% higher than the press-in portion of the inner ring, and the pressing portion of the union nut has the same radial contraction rate as the press-in portion of the inner ring.

A tube made of PFA was connected to each body of the examples 3 and 4 and the targets 5-7 with the inner ring and union nut, and then, the tube, body, inner ring and union nut underwent the heat cycle (change from a room temperature to a high temperature (about 200 degrees Celsius) and return to the room temperature.) Before and after the heat cycle, rates of resistance to pulling out the tube were measured.

The rates of resistance to pulling out the tube were obtained by comparison among measured values of resistances to pulling out the tube after the zeroth to fifth times of the heat cycle. More specifically, the rates are defined as the resistances, which were measured at each end of the first to fifth times of the heat cycle, divided by the resistance measured before the heat cycle, i.e. the resistance after the zeroth time of the heat cycle.

The measured values shown in FIG. 10 reveals that the rates of resistance to pulling out the tube in the examples 3 and 4 higher than those in the targets 5-7. In other words, the measured values clarify that the second embodiment of the invention has an effect of enhancing the resistance to pulling out the tube from the fitting even if the fitting undergoes the heat cycle repeatedly.

In view of the explanation described above, the invention can obviously have variations and modifications. Accordingly, it should be understood that the invention can have embodiments other than those in the description within the scope of the claims attached to the description.

DESCRIPTION OF REFERENCE SYMBOLS 1 resin tube fitting, 2 tube, 5 one longitudinal end of the tube, 11 body of fitting, 12 inner ring, 13 union nut, 22 outer sleeve, 31 press-in portion, 46 connector, 47 pressing portion, 101 resin tube fitting, 112 inner ring, 113 union nut.

What is claimed is:

1. A resin tube fitting connectable to a tube, while allowing a longitudinal end of the tube to be put therein, the fitting comprising:
   a body including a sleeve that allows the longitudinal end of the tube to be put therein;
   an inner ring including a press-in portion that is configured to be pressed into the longitudinal end of the tube, and to be put inside the sleeve together with the longitudinal end of the tube in which the press-in portion is put; and
   a union nut including a connector that is configured to, aiming at connecting the longitudinal end of the tube to the body, be screwed to an outer periphery of the body to allow the longitudinal end of the tube to be put radially between the connector and the press-in portion of the inner ring when the press-in portion is put inside the sleeve of the body together with the longitudinal end of the tube, wherein:
   the inner ring and the union nut are made of resin, which has a property of contracting when ambient temperature rises from room temperature and then falls to room temperature; and
   the connector of the union nut is designed to radially contract at a rate higher by 0.05% or more than the press-in portion of the inner ring when ambient temperature rises from room temperature and then falls to room temperature.

2. The resin tube fitting according to claim 1, wherein the inner ring and the union nut are made of the same kind of resin.

3. The resin tube fitting according to claim 1, wherein the inner ring and the union nut are made of different kinds of resin.

4. The resin tube fitting according to claim 1, wherein:
the union nut has a pressing portion configured to, when the connector is screwed to the outer periphery of the sleeve, press the longitudinal end of the tube from an outer radius onto the press-in portion, which is put inside the sleeve together with the longitudinal end of the tube; and
the pressing portion is designed to radially contract at a rate higher than the press-in portion of the inner ring when ambient temperature rises from room temperature and then falls to room temperature.

* * * * *